Patented Nov. 2, 1937

2,098,135

UNITED STATES PATENT OFFICE 2,098,135

COMPOSITION FOR DESTROYING SUCKERS IN TOBACCO AND TOMATO PLANTS

Carl Onasorg Daughety, Ayden, N. C., assignor, by direct and mesne assignments, to Carolina Chemical Company, a corporation No Drawing. Application January 19, 1937, Serial No. 121,375

4 Claims. (Cl. 47—1)

My invention relates generally to substance for application to tobacco and tomato plants to destroy the growth of suckers and prevent the loss of energy consumed in the growth and persistence of the suckers, and particularly to a liquid to be applied to prevent the growth of suckers after the plants are topped, and after the suckers have appeared to prevent their further growth and to destroy the same without harm to the plant, and an important object of my invention is to provide a substance and a method of applying the same, which promotes healthy and unburdened growth of the plants, while saving the expense of time and labor presently required to pluck the suckers by hand.

Other important objects of my invention will be apparent from a reading of the following description taken in connection with the examples given for illustrative purposes.

The substance of the present invention is composed essentially of the following ingredients in substantially the proportions stated:—

| | Parts |
|---|---|
| Lubricating oil | 5 |
| Linseed oil | 5 |
| Creosote oil | 1 |
| Gasoline | 2 |
| Fuel oil | 2 |

These proportions of these ingredients must be used in substantially the exact proportions set out above to form a gallon or other arbitrary quantity of the liquid composed of 20 parts.

Where a filler in the substance is desirable, the following additional ingredients are or may be employed:—

$\tfrac{1}{10}$ of a part of alcohol
$\tfrac{1}{10}$ of one part of turpentine
3 parts of cane syrup
$\tfrac{1}{10}$ of one part of vinegar
$\tfrac{1}{10}$ of one part of sulphur
$\tfrac{2}{10}$ of one part of lime
$\tfrac{1}{10}$ of one part of salt, and
1 part of pokeberry liquid It is to be understood that the preferable form of the invention contains the ingredients mentioned above as absolutely essential and also the ingredients stated as forming a filler, and it is to be further understood that while the last eight (8) ingredients named are not absolutely essential, the first five (5) ingredients mentioned as essential are absolutely necessary and must be used in the stated proportions in order to obtain a working example of the invention.

The mixture of the first five (5) essential ingredients causes an unusual result in the application thereof to the plant, in that a chemical reaction is set up in the tobacco or tomato plants which prevents the suckers from appearing immediately above the leaf when the substance is applied in the form of a drop or two of the liquid immediately after or just before the breaking out of the top of the plants. A similar reaction obtains where the plant is treated by application of one or two drops of the liquid after the sucker begins to appear; whereat the sucker fails to thrive and mature, and the energy otherwise consumed in its growth is retained in the leaves of the plant so that a better quality of tobacco is insured by the elimination of the sucker.

The liquid of the present invention is applied by dispensing the same in single drops from a common squirt can or other similar suitable device. One drop and not over two drops thereof is applied immediately on the top side of the leaf stem, where the stem issues from the stalk. If applied in other quantities and in any other places, a chemical reaction would be set up which would be injurious to the plant. In no case may the liquid of the present invention be utilized in spray form.

It is to be observed that the application in the manner indicated of the liquid of the present invention on the stem of the tobacco leaf next to the stalk and on the top side of said stem, will not in any way injure the plant, nor will it retard the growth of the plant, but will only prevent the growth of the sucker, which, if permitted to remain, would stop the life of the plant and cause the leaves higher up on the stalk to fail to develop their natural color and texture.

Although I have shown and described herein preferred embodiments of the substance and procedure of the present invention, it is to be definitely understood that I do not desire to limit the application of the invention thereto, and any change or changes may be made in the materials and ingredients, and in the method of providing and employing the same, within the spirit of the invention and the scope of the subjoined claims.

What is claimed is:—

1. A substance for destroying suckers in tobacco and tomato plants, said substance containing essentially quantities of lubricating oil, linseed oil, creosote oil, gasoline, and fuel oil.

2. A substance for destroying suckers in tobacco and tomato plants, said substance containing essentially quantities of lubricating oil, linseed oil, creosote oil, gasoline, and fuel oil as well as relatively small quantities of alcohol, turpentine, cane syrup, vinegar, sulphur, lime, salt, and pokeberry liquid.

3. A substance of the character indicated composed essentially of five parts of lubricating oil, five parts of linseed oil, one part of creosote oil, two parts of gasoline, and two parts of fuel oil.

4. A method of destroying suckers in tobacco and tomato plants, said method consisting of applying a drop or two of a liquid on the stem of the tobacco leaf next to the stalk and on the top side of said stem, said liquid containing as essential ingredients lubricating oil, linseed oil, creosote oil, gasoline, and fuel oil.

CARL ONASORG DAUGHETY.